United States Patent [19]

Faler et al.

[11] Patent Number: 4,783,502

[45] Date of Patent: Nov. 8, 1988

[54] STABLE NONAQUEOUS POLYURETHANE MICROPARTICLE DISPERSION

[75] Inventors: Dennis L. Faler, Glenshaw; Gregory J. McCollum, Gibsonia; James B. O'Dwyer, Valencia; Marvis E. Hartman, Pittsburgh, all of Pa.

[73] Assignee: PPG Industries, Inc., Pittsburgh, Pa.

[21] Appl. No.: 128,353

[22] Filed: Dec. 3, 1987

[51] Int. Cl.$^4$ ............................................. C08L 75/00
[52] U.S. Cl. .................................... 524/871; 524/872; 524/873; 524/875; 528/48; 528/76; 528/83
[58] Field of Search ............... 524/871, 872, 873, 875; 528/48, 76, 83

[56] References Cited

U.S. PATENT DOCUMENTS

| | | | |
|---|---|---|---|
| 3,485,802 | 12/1969 | Witsiepe | 260/77.5 |
| 3,525,717 | 8/1970 | Butler et al. | 260/75 |
| 3,655,627 | 4/1972 | Hutzler et al. | 260/77.5 AA |
| 3,748,294 | 7/1973 | Kershaw et al. | 260/22 TN |
| 3,787,525 | 1/1974 | McGarr | 260/859 R |
| 3,812,075 | 5/1974 | Burdett et al. | 260/33.60 A |
| 3,817,886 | 6/1974 | McGarr | 260/18 TN |
| 3,850,880 | 11/1974 | Christer et al. | 260/75 NE |
| 3,857,810 | 12/1974 | Baker et al. | 260/34.2 |
| 3,872,049 | 3/1975 | Farah et al. | 260/33.6 UB |
| 3,894,994 | 7/1975 | Day et al. | 260/75 NE |
| 3,917,741 | 11/1975 | McGarr | 260/859 R |
| 3,925,295 | 12/1975 | Osborn et al. | 260/34.2 |
| 3,935,155 | 1/1976 | Osmond et al. | 260/34.2 |
| 3,969,475 | 7/1976 | Horiuchi et al. | 264/310 |
| 3,981,839 | 9/1976 | Asher et al. | 260/33.6 R |
| 3,985,700 | 10/1976 | Nicks et al. | 260/33.6 R |
| 4,059,557 | 11/1977 | Bentley et al. | 260/31.2 N |
| 4,083,831 | 4/1978 | Santosusso | 260/77.5 AA |
| 4,102,846 | 7/1978 | Bentley et al. | 260/31.2 N |
| 4,107,256 | 8/1978 | Conrad et al. | 264/310 |
| 4,138,376 | 2/1979 | Nicks | 260/22 TN |
| 4,206,099 | 6/1980 | Bentley et al. | 260/22 CB |
| 4,229,339 | 10/1980 | Bentley et al. | 260/34.2 |
| 4,232,135 | 11/1980 | Bentley et al. | 525/509 |
| 4,294,735 | 10/1981 | Bentley et al. | 260/22 CB |
| 4,533,254 | 8/1985 | Cook et al. | 366/176 |
| 4,569,966 | 2/1986 | Piccirilli et al. | 524/589 |
| 4,644,033 | 2/1987 | Gnanou et al. | 524/590 |
| 4,705,839 | 11/1987 | Martin | 528/49 |

FOREIGN PATENT DOCUMENTS

| | | |
|---|---|---|
| 0238166 | 9/1987 | European Pat. Off. . |
| 956453 | 10/1965 | United Kingdom . |
| 1007476 | 10/1965 | United Kingdom . |
| 1408945 | 10/1975 | United Kingdom . |
| 1432112 | 4/1976 | United Kingdom . |
| 1428907 | 3/1977 | United Kingdom . |

OTHER PUBLICATIONS

"Power for the Competitive Edge", *Microfluidizer Processing Equipment*, Microfluidics Corporation, Newton, MA (1986).

Dowbenko and Hart, "Nonaqueous Dispersions as Vehicles for Polymer Coatings", *I & EC Product Research & Development*, vol. 12, (1973), pp. 14–28.

*Primary Examiner*—Maurice J. Welsh
*Attorney, Agent, or Firm*—Linda Pingitore

[57] ABSTRACT

A stable, nonaqueous polyurethane microparticle dispersion is characterized in that less than 20 percent of the polymer microparticles have a mean diameter greater than 5 microns, further characterized in that at a total solids content of 60 percent the Brookfield viscosity is less than 1000 centipoise measured at 50 RPM using a number 3 spindle at 25° C., the polyurethane being prepared from reactants which are substantially free of acrylic polymer and the polyurethane being further characterized in that it is substantially free of unreacted polyisocyanate monomer.

16 Claims, No Drawings

STABLE NONAQUEOUS POLYURETHANE MICROPARTICLE DISPERSION

CROSS REFERENCE TO RELATED APPLICATIONS

The application is related to Ser. No. 128,316, entitled "Method for Preparing Stably Dispersed Nonaqueous Microparticle Dispersion", and Ser. No. 128,315, entitled "Stable Nonaqueous Microparticle Dispersions Prepared from Aminoplast Resins", both filed even date herewith."

BACKGROUND OF THE INVENTION

The present invention relates to nonaqueous, microparticle dispersions.

Nonaqueous polyurethane microparticle dispersions have been known in the art for some time. However, the known aqueous polyurethane microparticle dispersions are not without attendant difficulties. The inability to prepare dispersions so that they are uniformly of a small particle size, that is, a predominant number of the particles have a mean diameter on the order of less than five microns, preferably less than one micron has been a major problem. In addition, generally because of the large particle size, nonaqueous polyurethane microparticle dispersions have suffered from the lack of stability especially when the continuous phase is of low viscosity. This typically means that the dispersion either settles upon standing or coagulates and forms large clumps. Moreover, the known nonaqueous polyurethane microparticle dispersions have been typically of low solids content. Therefore their use in coating applications has led to increased volatile organic content of the resultant coating compositions. Efforts to prepare the dispersions at higher solids levels has generally resulted in unmanageably high viscosities. Also, such polyurethane microparticle dispersions typically contain a substantial amount of residual unreacted polyisocyanate monomer which is undesirable from a toxicological standpoint.

In addition, certain compositions are difficult to prepare as nonaqueous dispersions by known techniques. In particular, polyurethane microparticle dispersions where the polyol component is essentially free of arcylic polymer are not available as stable, small particle size nonaqueous dispersions.

There is a need, therefore, for stable nonaqueous polyurethane microparticle dispersions having a uniformly small particle size and which are free of the difficulties attendant upon currently available materials.

SUMMARY OF THE INVENTION

In accordance with the present invention there is provided a stable, nonaqueous polyurethane microparticle dispersion characterized in that less than 20 percent of the polymer microparticles have a mean diameter greater than 5 microns, further characterized in that at a total solids content of 60 percent the Brookfield viscosity is less than 1000 centipoise measured at 50 RPM using a number 3 spindle at 25° C., the polyurethane being prepared from reactants which are substantially free of acrylic polymer and the polyurethane being further characterized in that it is substantially free of unreacted polyisocyanate monomer.

DETAILED DESCRIPTION OF THE INVENTION

The preferred method for preparing the claimed polyurethane microparticles which are stable dispersed in a nonaqueous medium involves several steps. The first step of the preferred method involves mixing into a nonaqueous medium a polymerizable component. The polymerizable component comprises at lesat one polymerizable species preferably at least two polymerizable species and moreover at least 20 percent of the polymerizable component is insoluble in the nonaqueous medium. For the purposes of the present application, the term "insoluble" means that the insoluble component is observable as a separate phase.

The nonaqueous medium provides the continuous phase of the emulsion or dispersion in which the microparticles are suspended. The nonaqueous medium is one which is inert to the reactants and preferably is non-polar. A wide variety of organic solvents can be utilized. Preferably, a major amount of the nonaqueous medium is made up of an aliphatic solvent or mixture of aliphatic solvents. Examples of suitable nonaqueous media are hydrocarbons such as acyclic aliphatic hydrocarbons having from 4 to 30 carbon atoms and which are saturated such as N-pentane, N-hexan, N-heptane and N-octane; and cyclic hydrocarbons such cyclohexane and methyl cyclohexane. Also, minor amounts of aromatic hydrocarbons such as xylene and toluene as well as other solvents including ketone solvents and ester solvents can be present. The preferred media are the acyclic aliphatic hydrocarbons. The liquid hydrocarbon may be a mixture of such materials and would include such commerically available products as mineral spirits and solvent naphtha.

If the polymerizable component is too viscous, for example a Brookfield viscosity greater than 20 poise measured at 50 RPM using a number 3 spindle at 25° C. or a Z Gardner Holdt viscosity, then a polar solvent such as N-methyl-2-pyrrolidone or acetonitrile can be used to dilute the polymerizable component. This is desirable from the standpoint that a less viscous polymerizable component requires less energy to particulate into small particles during the emulsification. However, the use of excessive amounts of polar solvents is not preferred because of the tendency of the polymerizable component to form a macrogel instead of discrete polymeric microparticles. It should be understood that the polar solvent can be inert to the reactants or it can be a reactive diluent such as, for example, N-vinyl pyrrolidone.

One can prepare the claimed nonaqueous dispersions initially at low solids and then concentrate to high solids by distillation. In such an instance, a combination of a low boiling solvent (boiling point less than 100° C.) and high boiling solvent (boiling point greater than 150° C.) is preferred.

As was mentioned above, at least 20 percent of the polymerizable component is insoluble in the nonaqueous medium. Generally, fewer difficulties are encountered when the majority of the polymerizable component is insoluble in the nonaqueous medium. The polymerizable component comprises at least one polymerizable species, preferably at least two polymerizable species. The polymerizable species are materials which contain functionality which is capable of reacting and polymerizing to form polyurethane polymer. In the present invention where the expression "polyurethane"

is used, not only polyurethanes from the reaction of polyisocyanates and polyols is intended but also mixed poly(urethane-ureas) and polyureas. Also, reaction products obtained from the reaction of polyisothiocyanates with active hydrogen-containing compounds are intended. At least one of the reactant species and preferably all, should be insoluble in the nonaqueous medium. The reactants can be monomeric materials, oligomers or polymers. The polymerizable species can be selected such that the polyurethane polymer can contain a variety of groups including ethylenically unsaturated free radically curable groups; isocyanate groups, hydroxyl groups, epoxy groups, anhydride groups, carboxyl groups and amino groups. These groups can be pendant or terminal. However, in a preferred aspect of the claimed invention the polyurethane polymer is free of isocyanate groups. For example, if one wishes to have unsaturated groups present one can utilize as a polymerizable species a hydroxyl functional vinyl monomer such as 2-hydroxyethyl acrylate or methacrylate or trimethylolpropane monoallyl ether.

Isocyanate or hydroxyl groups can be introduced by the appropriate ratio of polyisocyanate to polyol. Epoxy groups can be introduced by the addition of hydroxy functional epoxy compounds such as glycidol or certain polyglycidyl ethers of bisphenol A such as EPON 1001 available from Shell Chemical. Anhydride groups can be introduced by incorporation of polyanhydride such as a styrene maleic anhydride copolymer. Carboxyl groups can be introduced by reaction of a portion of the hydroxyl groups of the polyol with a cyclic anhydride either before, during or after the polyurethane polymerization. Tertiary amino groups can be introduced by the use of tertiary amine functional alcohols such as dimethylethanolamine. Primary amino groups can be introduced by post reaction of free isocyanates with ketamines, for example, diethylene triamine bis ketamine, followed by hydrolysis of the ketamine with water.

Examples of polymerizable species or reactants include active hydrogen containing materials such as, for example, polyester polyols, polyether polyols, and polyurethane polyols which are reacted with a polyisocyanate. Each of these materials is discussed in detail below. Although a variety of materials are disclosed, fewer difficulties are encountered in the preparation of the claimed dispersions when the material is insoluble in the nonaqueous medium.

In a preferred embodiment, the polymerizable species are an amine and a polyisocyanate. The amine can be generated by the reaction of water with the polyisocyanate. The resultant product is a polyurea microparticle dispersion. The particles can be crosslinked or uncrosslinked.

Examples of polyether polyols are polyalkylene ether polyols which include those having the following structural formula:

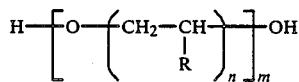

where the substituent R is hydrogen or lower alkyl containing from 1 to 5 carbon atoms including mixed substituents, and n is typically from 2 to 6 and m is from 2 to 100 or even higher. Included are poly(oxytetramethylene) glycols, poly(oxyethylene) glycols, poly(oxy-1,2-propylene) glycols and the reaction products of ethylene glycol with a mixture of 1,2-propylene oxide, ethylene oxide and alkyl glycidyl ethers.

Also useful are polyether polyols formed from oxyalkylation of various polyols, for example, glycols such as ethylene glycol, 1,6-hexanediol, Bisphenol A and the like, or other higher polyols, such as trimethylolpropane, pentaerythritol and the like. Polyols of higher functionality which can be utilized as indicated can be made, for instance, by oxyalkylation of compounds such as sorbitol or sucrose. One commonly utilized oxyalkylation method is by reacting a polyol with an alkylene oxide, for example, ethylene or propylene oxide, in the presence of an acidic or basic catalyst.

In addition to the high molecular weight polyols mentioned above, mixtures of both high molecular weight and low molecular weight polyols can be used. Among the low moleular weight polyols are diols, which are preferred, and triols such as aliphatic polyols including alkylene polyols containing from 2 to 18 carbon atoms. Examples include ethylene glycol, 1,4-butanediol, 1,6-hexanediol; cycloaliphatic polyols such as 1,2-hexanediol and cyclohexanedimethanol. Examples of triols include trimethylelpropane and trimethylelethane. Also useful are polyols containing ether linkages such as diethylene glycol and triethylene glycol.

Polyester polyols can be prepared by the polyesterification of an organic polycarboxylic acid or its functional equivalent (e.g., anhydride or ester) with organic polyols and/or an epoxide. Usually, the polycarboxylic acids and polyols are aliphatic or aromatic dibasic acids and diols.

The diols which are usually employed in making the polyester include alkylene glycols, such as ethylene glycol, neopentyl glycol and other glycols such as hydrogenated Bisphenol A, cyclohexanediol, cyclohexanedimethanol, caprolactone derived diols, for example, the reaction product of epsilon-caprolactone and ethylene glycol, hydroxy-alkylated bisphenols, polyether glycols, for example, poly(oxytetramethylene) glycol and the like. Polyols of higher functionality can also be used. Examples include trimethylolpropane, trimethylolethane, pentaerythritol and the like, as well as higher molecular weight polyols such as those produced by oxyalkylating lower molecular weight polyols.

The acid component of the polyester consists primarily of monomeric carboxylic acids or anhydrides having 2 to 36 carbon atoms per molecule. Among the acids which are useful as phthalic acid, isophthalic acid, terephthalic acid, tetrahydrophthalic acid, decanedioic acid, dodecanedioic acid, and other dicarboxylic acids of varying types. The polyester may include minor amounts of monobasic acid such as benzoic acid, stearic acid, acetic acid, hydroxystearic acid and oleic acid. Also, there may be employed higher polycarboxylic acids such as trimellitic acid and tricarballylic acid. Where acids are referred to above, it is understood that anhydrides of those acids which form anhydrides can be used in place of the acid. Also, lower alkyl esters of the acids such as dimethyl glutarate and dimethyl terephthalate can be used.

Besides polyester polyols formed from polybasic acids and polyols, polylactone-type polyesters can also be employed. These products are formed from the reaction of a lactone such as epsiloncaprolactone and a polyol. The product of a lactone with an acid-containing polyol can also be used.

In addition to the aforedescribed polyols, polyurethane polyols can also be used. These polyols can be prepared by reacting any of the above-mentioned polyols with a minor amount of organic polyisocyanate (OH/NCO equivalent ratio greater than 1:1) so that terminal hydroxyl groups are present.

The organic polyisocyanate can be an aliphatic polyisocyanate, including a cycloaliphatic polyisocyanate or an aromatic polyisocyanate. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, 1,4-methylene bis(cyclohexyl isocyanate) and isophrone diisocyanate. Useful aromatic diisocyanates include the various isomers of toluene dissocyanate, meta-xylene-diisocyanate, and para-xylene-diisocyanate, also 4-chloro-1,3-phenylene diisocyanate, 1,5-tetrahydro-naphthalene diisocyanate, 4,4'-dibenzyl dissocyanate and 1,2,4-benzene triisocyanate can be used. In addition the various isomers of alpha, alpha, alpha'-tetramethyl xylene diisocyanate can be used. Also useful as the polyioscyanate are isocyanurates such as DESMODUR 3300 from Mobay and biurets of isocyanates such as DESMODUR N100 from Mobay.

The proporation of each of the materials which make up the polymerizable component can vary widely depending upon the polymeric structure desired. Typically the dispersion stabilizer or dispersant which is discussed below is used in an amount of from about 5 percent by weight to about 30 percent by weight, based on the total weight of the solid generating component of the pre-emulsification mixture. The balance is polymerizable component. For the purposes of determining these percentages the solid generating component does not include the inert materials which make up the nonaqueous medium as it has been defined herein. Reactive diluents as they have been defined herein, however, are considered to be solid generating.

Once the polymerizable component has been thoroughly mixed with the nonaqueous medium, the mixture is subjected to stress in order to particulate the mixture into microparticles which are uniformly of a fine particle size. The mixture is subjected to stress sufficient to result in a dispersion such that after polymerization less than 20 percent of the polymer microparticles have a mean diameter greater than 5 microns.

The preferred mode of subjecting the mixture of polymerizable component and nonaqueous medium to the appropriate stress is by use of a MICROFLUIDIZER ® emulsifier which is available from Microfluidics Corporation in Newton, Massachusetts. The MICROFLUIDIZER ® high pressure impingement emulsifier is patented in U.S. Pat. No. 4,533,254 which is incorporated herein by reference. The device consists of a high pressure (up to 20,000 psi) pump and an interaction chamber where the emulsification takes place. The pump forces the mixture of reactants in nonaqueous medium into the chamber where it is split into at least two streams which pass at a very high velocity through at least two slits and collide resulting in the particulation of the mixture into small particles. Generally, the reaction mixture is passed through the emulsifier once at a pressure between 5,000 and 15,000 psi. Multiple passes result in smaller average particle size and a narrower range for the particle size distribution. When using the aforesaid MICROFLUIDIZER ® processing equipment, stress is applied by liquid liquid impingement as has been described. However, it should be understood that if desired, other modes of achieving emulsification of the pre-emulsification mixture can be utilized so long as sufficient stress is applied to achieve the requisite particle size distribution, that is, such that after polymerization less than 20 percent of the polymer microparticles have a mean diameter greater than 5 microns. For example, one alternative manner of applying stress would be the use of ultrasonic energy.

Stress is defined as force per unit area. Although the precise mechanism by which the MICROFLUIDIZER ® emulsifier stresses the pre-emulsification mixture to particulate it is unknown, it is theorized that stress is exerted in more than one manner. It is believed that one manner in which stress is exerted is by shear. Shear means that the force is such that one layer or plane moves parallel to an adjacent, parallel plane. Stress can also be exerted from all sides as a bulk, compression stress. In this instance stress could be exerted without any shear. A further manner of producing intense stress is by cavitation. Cavitation occurs when the pressure within a liquid is reduced enough to cause vaporization. The formation and collapse of the vapor bubbles occurs violently over short time periods and produces intense stress. Although not intending to be bound by any theory, it is believed that both shear and cavitation contribute to producing the stress which particulates the pre-emulsification mixture.

Once the mixture has been particulated into microparticles, the polymerizable component within each particle is now polymerized under conditions sufficient to produce polymer microparticles which are stably dispersed in the nonaqueous medium. It should be understood that one of the requisite conditions sufficient to achieve the stably dispersed microparticle is the presense in the reaction mixture of a dispersion stabilizer also termed a dispersant. The dispersion stabilizer is preferably medium prior to particulation. Alternatively, the dispersant can be introduced into the medium at a point just after the particulation within the MICROFLUIDIZER ® emulsifier. The dispersant, however, is an important part of the polymerizable component necessary to achieve the requisite particle stability. The stabilizer is a material whose role is to prevent the emulsified particles from agglomerating to form larger particles.

The same variety of dispersion stabilizers or dispersants which can be utilized during conventional nonaqeuous emulsion polymerization are also suitable for the claimed technique. For a detailed listing of several suitable stabilizers see Dowbenko and Hart, "Nonaqueous Dispersions as Vehicles for Polymer Coatings", I&EC Product Research and Development, Vol. 12, March 1973, pages 14 to 20, copyright 1973. A preferred dispersion stabilizer is known as the comb stabilizer. Preparation of the comb type graft dispersant involves the polyesterification of preferably 12-hydrostearic acid to provide a soluble polymer chain with a terminal carboxylic acid. This is then reacted with glycidyl methacrylate to form a linear macromonomer. The preparation of the comb type graft dispersant is disclosed in U.S. Pat. No. 3,607,821 which is incorporated herein by reference.

It should be understood that in some instances it may be desirable for some of the reactant species to be added after particulation of the remaining reactants and the nonaqueous medium. These reactants can be added either before or during the polymerization. For example, in the preparation of a polyurea directly from amine and polyisocyanate or when water is used initially to react with the polyisocyanate to generate amine, it is preferred that the amine or water be added to the isocyanate functional microparticle dispersion rather than being added prior to particulation.

The particulated mixture is then subjected to conditions sufficient to induce polymerization of the polymerizable mixture within the microparticles. The particular conditions will vary depending upon the actual materials being polymerized. The temperature can vary from about 20° C. to about 120° C., preferably 80° C. to 100° C. The length of time required to complete polymerization typically varies from about three hours to about 12 hours. Usually, the preparation of a polyurethane microparticle dispersion requires a temperature of about 85° C. to 90° C. for a period of from about three to about five hours.

The progess of the polymerization reaction can be followed by techniques conventionally known to those skilled in the art of polymer chemistry. For example, isocyanate equivalent weight and infrared spectroscopy can be used.

Furthermore, it should be understood that small amounts of chain extenders such as diamines or capping agents such as monoalcohols can be post added to the partially reacted polymerizable component to chemically mofidy the particles or to either increase or limit the molecular weight.

Once the polymerization is complete, the resultant product is a stable dispersion of polymer microparticles in a nonaqueous medium, wherein the polymer is contained within each particle. The nonaqueous medium therefore is substantially free of dissolved polymer since it is essentially self-contained within each microparticle. The resultant polymer microparticles are of course insoluble in the nonaqueous medium. In saying that the nonaqueous medium is substantially free of dissolved polymer, it is intended that the term "substantially free" means that the nonaqueous medium contains no more than 30 percent by weight of dissolved polymer, preferably no more than 15 percent.

By "stably dispersed" is meant that the polymer microparticles do not settle upon standing and do not coagulate or flocculate on standing. Typically, when diluted to 50 percent total solids the claimed dispersions do not settle even when aged for one month at room temperature.

As was stated above, a very important aspect of the polymer microparticle dispersions of the claimed invention is that the particle size is uniformly small, i.e., after polymerization less than 20 percent of the polymer microparticles have a means diameter which is greater than 5 microns, more preferably greater than 1 micron. Preferably the mean diameter of the particles after polymerization ranges from about 0.05 microns to about 0.5 microns. The particle size can be measured with a particle size analyzer such as the Coulter N4 instrument commercially available from Coulter. The instrument comes with detailed instructions for making the particle size measurements. However, briefly, a sample of the nonaqueous dispersion is diluted with heptane until the sample concentration falls within specified limits required by the instrument. The measurement time is 10 minutes. Moreover, generally the microparticle dispersions are characterized by the property that in the absence of a polar solvent, when at a solids content of 60 percent, the Brookfield viscosity is less than 1000 centipoise measured at 50 RPM using a number 3 spindle at 25° C.

It should be understood that the claimed nonaqueous, polymer microparticle dispersions can be thixotropic. That is, their viscosity can increase if they are allowed to stand undisturbed; however, upon application of sufficient high shear for a period of time the viscosity will be decreased.

The claimed microparticle dispersions are high solids materials of low viscosity. Dispersions can be prepared directly with a total solids content of from about 45 percent to about 60 percent. They can also be prepared at a lower solids level of about 30 to about 40 percent total solids and concentrated to a higher level of solids of about 55 to about 75 percent by stripping. This can even be done during the polymerization. The molecular weight and viscosity of the claimed nonaqueous dispersions are independent of each other. The weight average molecular weight can range from a few hundred to greater than 100,000. The Brookfield viscosity can also vary widely from about one poise to about 100 poise, preferably from about 1 to about 5 poise when measured at 25° C. using a number 3 spindle at 50 RPM.

The microparticle dispersions can be either crosslinked or uncrosslinked. When uncrosslinked the polyme within the microparticles can also be either linear or branched.

In the preparation of polyurethanes, the use of difunctional polyisocyanates and active hydrogen containing materials results in linear materials. The incorporation of materials of higher functionality leads to branching and/or crosslinking. As is appreciated by those skilled in polymer chemistry, the ratio of the reactants determines the molecular weight, degree of branching and degree of crosslinking.

The polyurethane microparticle dispersions of the claimed invention are further characterized in that the polyurethane is prepared from reactants which are substantially free of arcylic polymer. By "substantially free of acrylic polymer" is meant that the reactants contain no more than about 30 percent by weight of acrylic polymer, preferably no more than about 20 percent by weight and more preferably no more than about 10 percent by weight based on the total weight of the reactants of the polyurethane polymer. Those skilled in the art of polymer chemistry readily appreciate the meaning of the expression "acrylic polymer" therefore, no additional explanation is felt to be necessary.

Moreover, the claimed polyurethane dispersions are substantially free of unreacted polyisocyanate monomer. This means that no more than about 5 percent, preferably no more than about 1 percent, more preferably essentially no amount of unreacted polyisocyanate monomer remains in the particle after polymerization.

The nonaqueous dispersions of the present invention are very advantageous. They can be used in a variety of protective and decorative coatings including coatings, adhesives, sealants, molding resins, casting resins and free films. As has been mentioned above, they are high solids materials but of a low viscosity. The fact that they are high solids materials is particularly advantageous. Since the claimed dispersions are of high solids they can be utilized in coating applications without significantly increasing the volatile organic content of the composition.

In addition, depending upon the active hydrogen containing material the polyurethane microparticles can be tailored so as to result in improved impact resistance, and flexibility of the resultant coating.

The following examples are illustrative of the invention and are not intended to be limiting.

EXAMPLE I

This example illustrates the preparation of a nonaqueous, hydroxyl functional polyurethane crosslinked microparticle dispersion.

A solution was prepared by mixing the following ingredients in the indicated proportions:

| Ingredients | Parts by Weight (grams) |
|---|---|
| FORMREZ 55-56[1] | 1300 |
| 1,4-butanediol | 117 |
| DESMODUR N3300[2] | 507 |
| dispersant[3] (40 percent solution) | 534.3 |

[1]This poly(neopentyl glycol adipate) is commercially available from Witco. It has a hydroxyl number of 55.
[2]This isocyanurate of hexamethylene diisocyanate is commercially available from Mobay Chemical Corporation (Bayer).
[3]This dispersant is a comb type stabilizer and is prepared as set out below:

The preparation of the comb type stabilizer is done in two steps.

Step A: Synthesis of poly(12-hydroxystearyl) methacrylate: A five liter round bottom flask was charged with 444.5 g of toluene and 100 g of 12-hydroxystearic acid. The solution was heated at 85° C. while 2420 g of solid 12-hydroxystearic acid was added slowly enough to allow the mixture to be stirred as the solid melted and dissolved. After a homogeneous solution was obtained, 5.04 g of methanesulfonic acid was added and the mixture was heated to reflux (136° C. to 147° C.) while the water produced during the reaction was collected in a Dean Stark trap. When the acid value reached 30 the mixture was allowed to cool to 125°. After first adding 2.52 g of IONOL (2,6-ditertiarybutyl para-cresol from Shell Chemical Company) dissolved in 2.52 g of toluene and 11.5 g of VM+P naphtha, 304.5 g of glycidyl methacrylate and 10.1 g of dimethylcocoamine were added. The resulting solution was then heated at reflux (149° C.) until the acid value dropped to 0.1.

Step B: Copolymerization of poly(12-hydroxystearyl) methacrylate with acrylic monomers:

A five liter round bottom flask charged with 421 g of toluene was heated at reflux while the following two solutions were added simultaneously over a three hour period.

| Monomer | |
|---|---|
| 958 g | poly(12-hydroxystearyl) methacrylate of Part A |
| 710 g | methyl methacrylate |
| 64 g | glycidyl methacrylte |
| 16 g | methacrylic acid |
| 721 g | VM + P naphtha |

| Initiator | |
|---|---|
| 28 g | 2,2'-azobis(2-methylbutanenitrile), VAZO-67 from E. I. DuPont deNemours. |
| 250 g | toluene. |

When the additions were complete, 3.2 g of VAZO-67 dissolved in 50 g of toluene was added over a one hour period. The solution was held at reflux for one or more hour before cooling.

The above solution was added while stiring to 4680 grams of a 1:1 mixture of heptane (boiling range of 94° C. to 98° C.) and ISOPAR G (commerically available from Exxon and has a boiling range of 156° C. to 176° C.). Vigorous stirring of the total mixture produced a pre-emulsion which was passed through a MICROFLUIDIZER ® M-110 emulsifier at a pressure of 9000 psi. 2.1 grams of dibutyltin diacetate and 21 grams of triethylamine were added to the resulting emulsion which was then heated at 70° C. for nine hours. During the last six hours a vacuum was applied to remove solvent until a final total solids content of 64.0 percent was achieved. The Brookfield viscosity, using a number 2 spindle at 50 rpm, of the opaque, bluish-white produce was 340 centipoise. The mean particle size, as measured on a Coulter N4 particle size analyzer, was 249 nanometers (0.249 micron) with a standard deviation of 58 nanometers (0.058 micron).

EXAMPLE II

This Example illustrates the preparation of an acrylate functional polyurethane crosslinked microparticle dispersion.

A mixture of the following ingredients was prepared

| Ingredients | Parts by Weight (grams) |
|---|---|
| FORMREZ 55-56 | 1000 |
| DESMODUR N100[6] | 95 |
| 1,4-butanediol | 60 |
| isophorone diisocyanate | 360 |
| hydroxyethyl acrylate | 190 |
| dispersant of footnote (3) | 473 |
| acetonitrile | 200 |
| IONOL[7] | 1.9 |

[6]This is the biuret of hexamethylene diisocyanate and it is commercially available from Mobay Chemical Corporation (Bayer).
[7]This is 2,6-ditertiarybutylparacresol which is commercially available from Shell Chemical Company.

The above solution was added while stirring vigorously to 3900 grams of ISOPAR E (aliphatic solvent having boiling range between 116° C. and 138° C., commercially available from Exxon). The resulting mixture was passed once through a MICROFLUIDIZER ® M-110 emulsifier and then heated at 50° C. for 10 hours. Two grams of dibutylin dilaurate was added and heating was continued for an additional 15 hours until no isocyanate was detectable by infrared spectroscopy. Vacuum distillation of solvent from the emulsion yielded a final total solids content of 62.1 percent and a Brookfield viscosity of 260 centipoise using a number 2 spindle at 50 rpm.

EXAMPLE III

This example illustrates the preparation of an uncrosslinked linear polyurethane microparticle dispersion.

The following ingredients were mixed together to form a solution:

| Ingredients | Parts by Weight (grams) |
| --- | --- |
| FORMREZ 55-56 | 1000 |
| 1,4-butane diol | 180 |
| trimethylhexamethylene diisocyanate | 642 |
| dispersant of footnote (3) | 512 |
| N—methyl pyrrolidone | 200 |

A mixture was formed by adding the above solution, while stirring, to 4,000 grams of a solvent mixture consisting of one part of ISOPAR G and three parts of heptane (boiling range 94° C. to 98° C.). The mixture was then passed through a MICROFLUIDIZER® M-110 emulsifier at 9,000 psi and 2 grams of dibutyltin diacetate and 20 grams of triethylamine were added to the emulsion. After heating the emulsion for 8 hours at 70° C., the infrared spectrum of a sample of the mixture indicated the presence of isocyanate. The temperature was held at 70° C. while 50 grams of a mixture of 4 parts of propylene glycol monomethyl ether acetate and one part of ethylenediamine was added, dropwise, over a period of two hours. After the infrared spectrum of a sample indicated that all of the isocyanate had reacted, the solvent was distilled under vacuum until a final solids content of 57.6 percent was achieved. The Brookfield viscosity at 50 RPM using a number 2 spindle was 370 centipoise. The mean particle size, measured on a Coulter N4 particle size analyzer was 362 nanometers (0.362 micron) with a standard deviation of 230 nanometers (0.230 micron).

EXAMPLE IV

This Example illustrates the preparation of a crosslinked polyurea nonaqueous microparticle dispersion.

A mixture was prepared by stirring together the following ingredients:

| Ingredients | Parts by Weight (grams) |
| --- | --- |
| DESMODUR N100 | 1620 |
| dispersant of footnote (3) | 448.2 |
| ethyl acetate | 540 |
| ISOPAR E | 4050 |

The mixture was passed through a MICROFLUIDIZER® M-110 emulsifier to produce a bluish-white emulsion. After 75 g of water and 3 g of dibutyltin dilaurate were added, the emsulsion exothermed to 40° C. and began to evolve gas. After 20 hours of stirring without external heating, 50 g of water was added and the emulsion heated at 50° C. for 30 minutes at which point a sample of the reaction mixture examined by infrared spectroscopy indicated the absence of isocyanate. Solvent was removed by vacuum distillation at 50° C. until a total solids content of 60.3 percent was achieved. The Brookfield viscosity of the final product was 60 centipoise using a number 3 spindle at 50 RPM. The particle size distribution was bimodal with about two-thirds of the particles having a diameter of 276 nanometers (0.276 micron) with a standard deviation of 90 nanometers (0.090 micron) and one-third of the particles having a diameter of 983 nanometers (0.983 micron) with a standard deviation of 150 nanometers (0.150 micron).

EXAMPLE V

This Example illustrates the preparation of an acid functional polyurethane nonaqueous microparticle dispersion.

A solution was prepared by mixing the following ingredients together:

| Ingredients | Parts by Weight (grams) |
| --- | --- |
| FORMREZ 55-56 | 1400 |
| 1,4-butanediol | 315 |
| DESMODUR N100 | 136.5 |
| trimethyl hexamethylene diisocyanate | 524.3 |
| methyl hexahydrophthalic anhydride | 176.4 |
| dispersant of footnote (3) | 711.2 |

The above solution was added with vigorous stirring to 840 g of ISOPAR K (aliphatic solvent with a boiling point range of 177° C. to 197° C. commercially available from Exxon) and 3080 g heptane (boiling point range 94° C. to 98° C.) and the resulting pre-emulsion was passed through a MICROFLUIDIZER® M-110 emulsifier at 9100 psi. Then, 2.8 g of dibutyltin diacetate and 28 g triethylamine were added to the emulsion which as heated at 70° C. for about four hours. After three hours the infrared spectrum of a sample did not show the presence of anhydride functionality and after four hours the infrared spectrum showed that no isocyanate functionality remained. The emulsion was vacuum stripped at 50° C. until a final total solids of 64.4 percent was obtained. The acid equivalent weight of the final emulsion was 4,520.

EXAMPLE VI

This Example illustrates the preparation of an amine functional polyurethane nonaqueous microparticle dispersion.

A mixture was prepared by stirring together the following ingredients:

| Ingredients | Parts by Weight (grams) |
| --- | --- |
| DESMODUR N100 | 1330 |
| 1,4-butanediol | 220.5 |
| acetonitrile | 210 |
| dispersant of footnote (3) | 474.6 |

The above solution was added while stirring to 3920 g heptane (boiling range of 94° C. to 98° C.) to produce a pre-emulsion which was passed through a MICROFLUIDIZER® M-110 emulsifier at 7500 psi. The resulting emulsion was heated to 70° C. over a one hour period and then held at that temperature for an additional hour. Then, 156 g of dimethylethanolamine was added over a 45 minute period. The temperature was held at 70° C. for one hour at which time the infrared spectrum of a sample indicated that no isocyanate remained. The dispersion was vacuum distilled at 70° until a final total solids content of 66.3 percent was achieved.

What is claimed is:

1. A stable, nonaqueous polyurethane microparticle dispersion is characterized in that less than 20 percent of the polymer microparticles have a mean diameter greater than 5 microns, further characterized in that at a total solids content of 60 percent the Brookfield viscosity is less than 1000 centipoise measured at 50 RPM using a number 3 spindle at 25° C., the polyurethane being prepared from reactants which are substantially free of acrylic polymer and the polyurethane being further characterized in that it is substantially free of unreacted polyisocyanate monomer.

2. The microparticle dispersion of claim 1 wherein less than 20 percent of the polymer microparticles have a mean diameter greater than 1 micron.

3. The microparticle dispersion of claim 1 wherein the mean diameter of the polymer microparticles ranges from about 0.05 micron to about 0.5 micron.

4. The microparticle dispersion of claim 1 wherein the polyurethane is prepared from an active hydrogen containing material and a polyisocyanate.

5. The dispersion of claim 4 wherein the active hydrogen containing material is selected from polyols, amines, and acid functional materials.

6. The dispersion of claim 4 wherein the polyurethane contains groups selected from ethylenic unsaturation, hydroxyl, epoxy, carboxyl and amino.

7. The dispersion of claim 1 wherein the polyurethane polymer is contained within each microparticle and the nonaqueous medium is substantially free of dissolved polymer.

8. The dispersion of claim 7 wherein the nonaqueous medium contains no more than 30 percent of dissolved polymer.

9. The dispersion of claim 8 wherein the nonaqueous medium contains no more than 15 percent of dissolved polymer.

10. The dispersion of claim 5 wherein the polyol is selected from the group of polyester polyols, polyether polyols, and polyurethane polyols.

11. The dispersion of claim 1 wherein the reactants contain no more than about 30 percent by weight of acrylic polymer based on the total weight of the reactants of the polyurethane polymer.

12. The dispersion of claim 11 wherein the reactants contain no more than about 20 percent by weight of acrylic polymer.

13. The dispersion of claim 12 wherein the reactants contain no more than about 10 percent by weight of acrylic polymer.

14. The dispersion of claim 1 wherein the polymer microparticles are crosslinked.

15. The dispersion of claim 1 wherein the polymer microparticles are uncrosslinked.

16. The dispersion of claim 1 wherein the polyurethane polymer is essentially free of isocyanate groups

* * * * *